Patented Feb. 27, 1923.

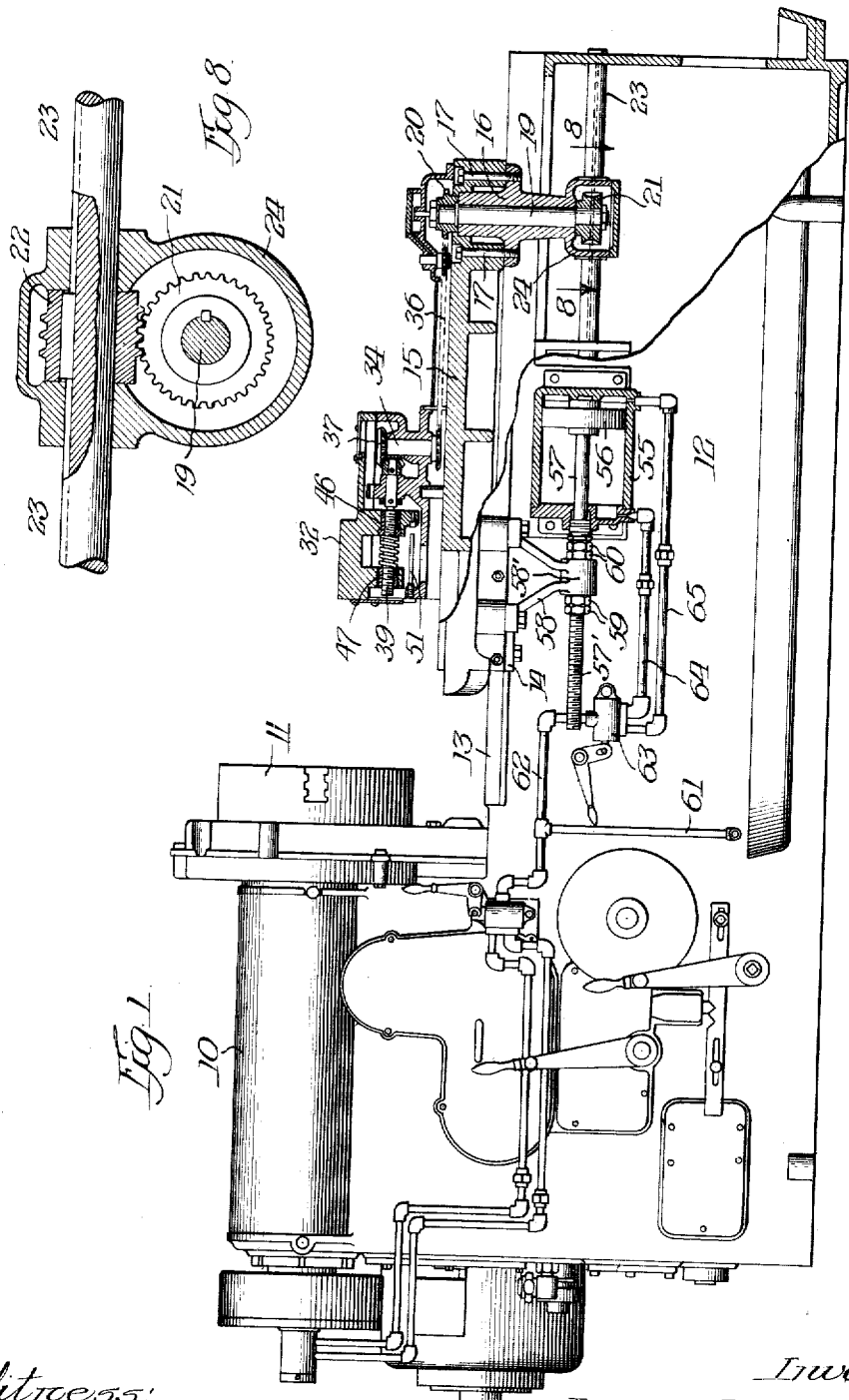

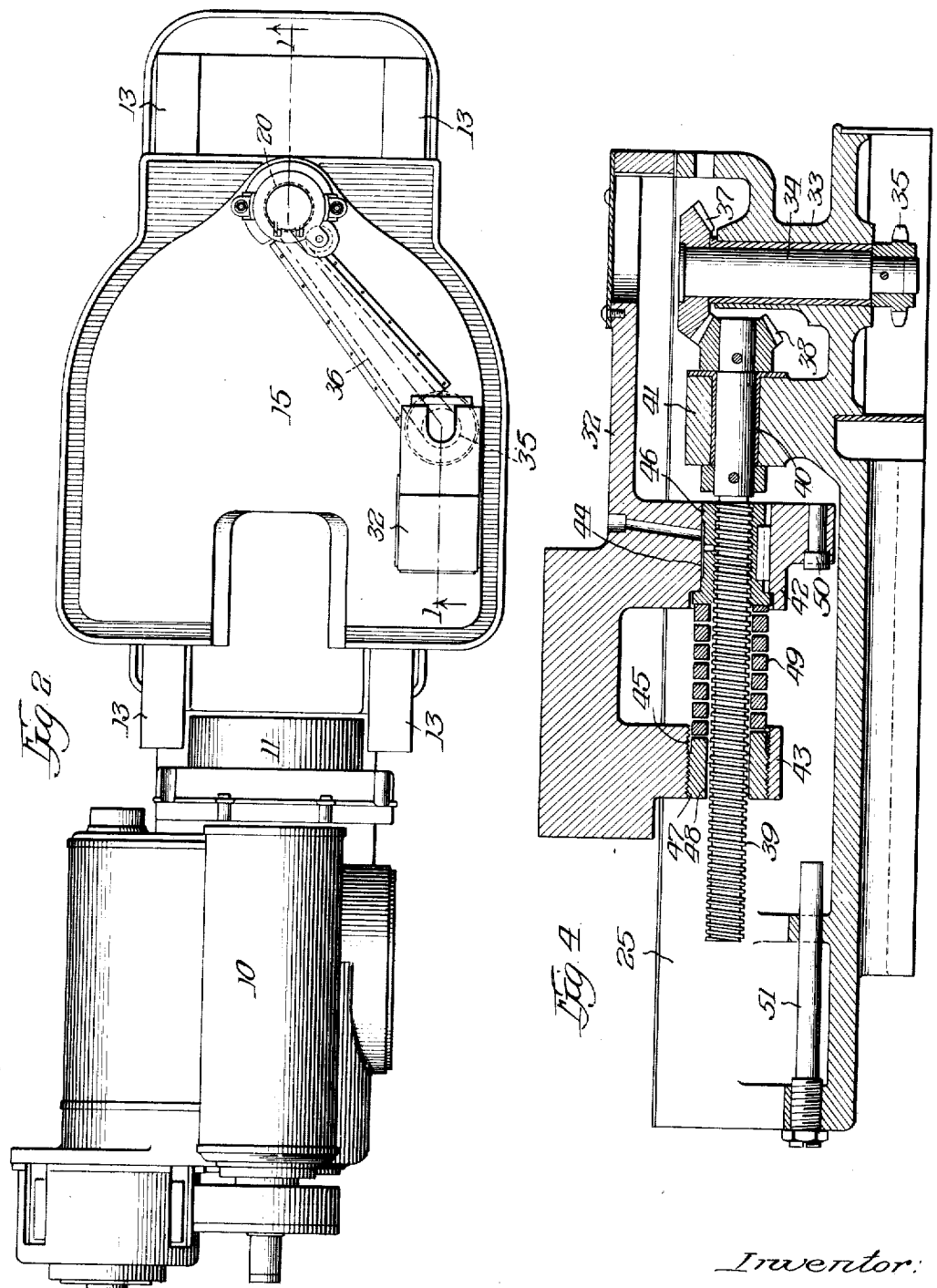

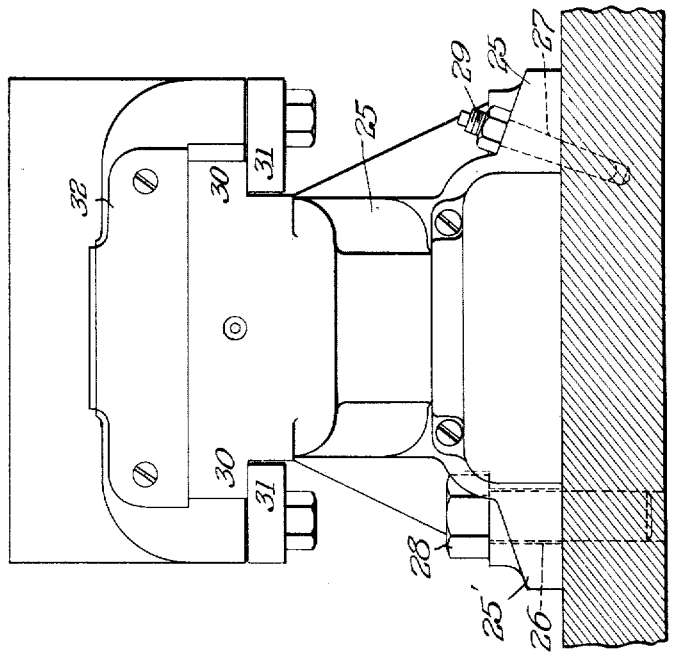
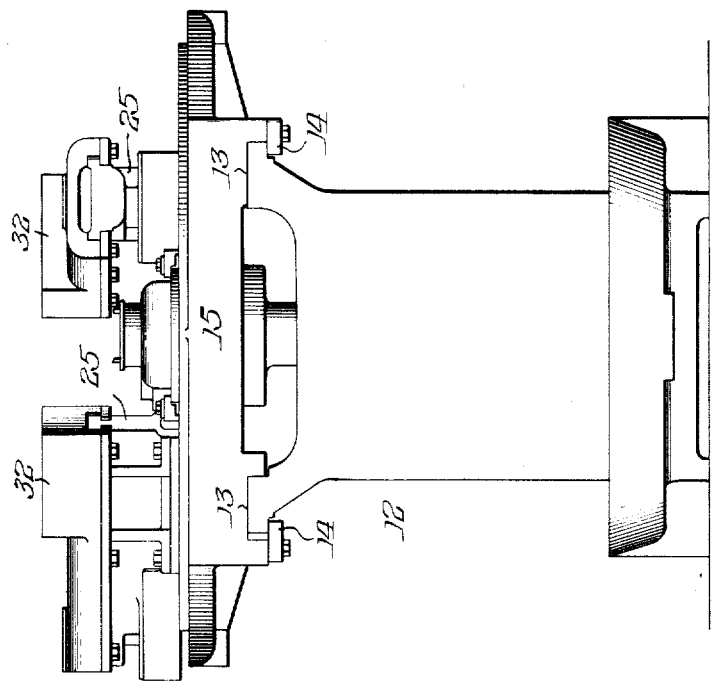

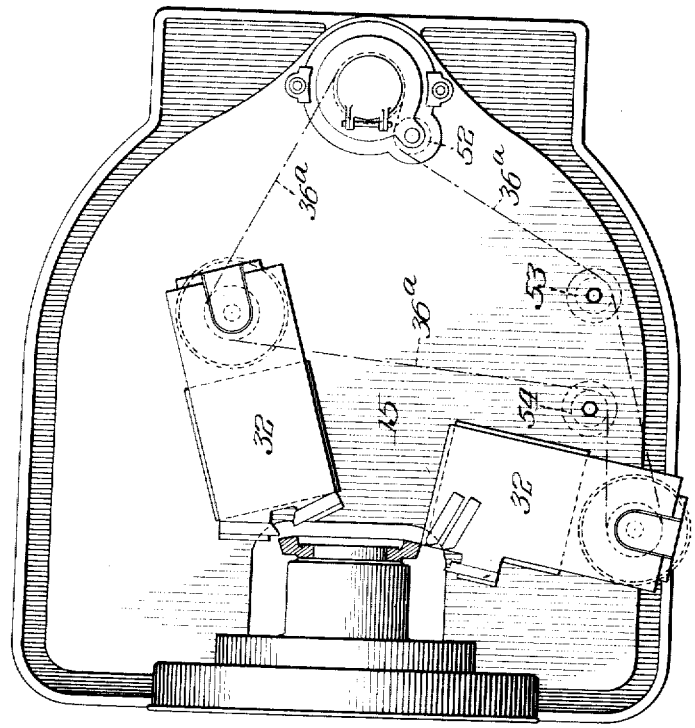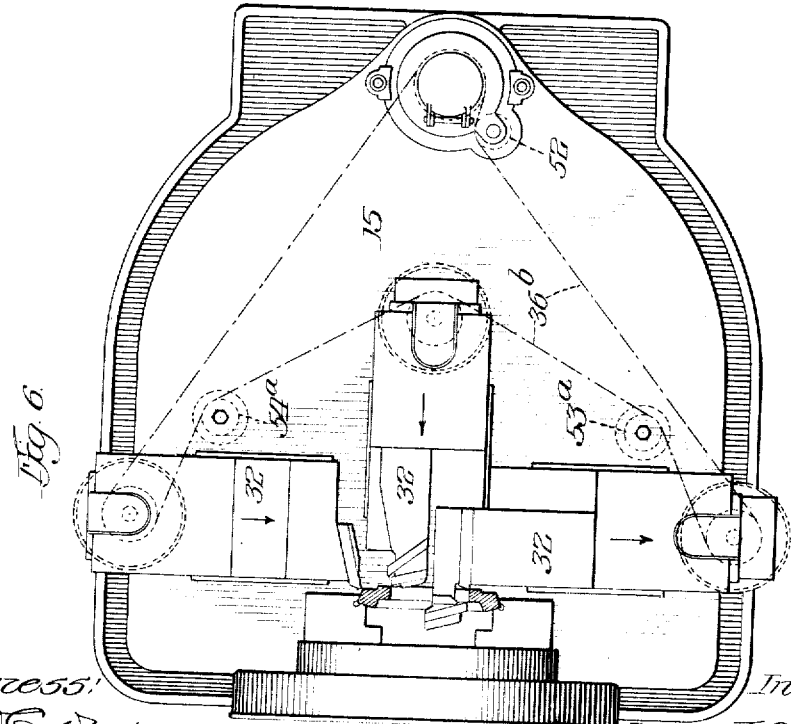

1,446,557

UNITED STATES PATENT OFFICE.

LOUIS E. GODFRIAUX, OF MADISON, WISCONSIN, ASSIGNOR TO GISHOLT MACHINE CO., OF MADISON, WISCONSIN, A CORPORATION OF WISCONSIN.

LATHE.

Application filed May 31, 1921. Serial No. 473,655.

*To all whom it may concern:*

Be it known that I, LOUIS E. GODFRIAUX, a citizen of the United States, residing at Madison, in the county of Dane and State of Wisconsin, have invented certain new and useful Improvements in Lathes, of which the following is a specification.

This invention relates to the general art of machine tools, and has reference more particularly to that class of machine tools commonly known as lathes. An important object of the invention is to produce a lathe which shall be of very simple and inexpensive construction and at the same time shall possess a high degree of flexibility—by which is meant capability of performing a large number of cutting operations from practically any angle on the work held in the chuck or fixture. More specific objects, ancillary and subsidiary to the main object, are, to provide a lathe wherein the tool carriers with their feed devices may all be mounted on a sliding table itself mounted on the bed of the lathe and capable of being rapidly traversed toward and from the work; to provide such a lathe wherein the tool carriers may be be universally positioned and fixed on the table in any desired or suitable angular relations to the work and to each other; to provide such a lathe wherein the feed devices of the several slides (where a plurality of slides are employed) may all be driven simultaneously from a common transmission shaft itself mounted on and carried by the table; to provide such a lathe wherein the common transmission shaft of the slide feeds may remain in geared relation to a feed shaft, which drives the same, during the rapid traverse movements of the table as well as when the latter is stationary; to provide, in such a lathe, a table actuating mechanism of such a character that it will always hold the table locked against movement while the tools are engaged with the work; to provide, in such a lathe, an improved feed stop mechanism which will arrest the inward travel of the tool slide at the point of completion of the cut and hold the slide stationary during a few revolutions of the work to effect a clean up cut; to provide, in such a lathe, a feed mechanism which on completion of the feeding and clean up cuts will retract the tool slide or slides and return them to their starting positions; to provide, in such a lathe, a simple and practical means for securing the tool carriers on the table after their correct positions on the latter have been determined; and to provide, in such a lathe, an improved power mechanism for effecting the in and out rapid traverse movements of the table, which provides clearance between the tools and the chuck or fixture for the removal of the finished piece and the insertion of a rough one, and which is also provided with a means of longitudinal adjustment for the setting up of the tools and work in proper relation.

Other objects and attendant advantages of the invention will be apparent to those skilled in the art as the same becomes better understood by reference to the following detailed description, and the accompanying drawings, wherein I have illustrated one practical and approved embodiment of the invention, and in which—

Fig. 1 is a side elevation, partly broken away and in section on the line 1—1 of Fig. 2, of a lathe embodying the present invention;

Fig. 2 is a top plan view of the lathe shown in Fig. 1;

Fig. 3 is an end elevation of the same, viewed from the right of Figs. 1 and 2;

Fig. 4 is a vertical longitudinal section, on an enlarged scale, through one of the tool slide bases and its tool slide;

Fig. 5 is an end elevation of Fig. 4, viewed from the right of the latter;

Figs. 6 and 7 are top plan views of the bed and sliding table, showing different groupings of tool slide bases and slides thereon; and Fig. 8 is a sectional detail on the line 8—8 of Fig. 1.

Referring to the drawings, 10 designates as a whole the headstock of the lathe which may be of ordinary and standard construction including the usual back-gears, spindle, feed trip mechanism, compressed air chucking mechanism and chuck, the latter being indicated at 11. 12 designates as a whole the bed, on the upper side of which are formed flat parallel ways 13 (Fig. 3). Slidably mounted and guided on the ways 13, and confined thereon by gibs 14, is a flat horizontal table 15, which, as shown in Fig. 2, may have a width somewhat greater than that of the lathe bed, and a length approximating the full length of the ways of the bed, thus providing a top surface of considerable area. The rear end of the table 15 is centrally apertured to receive a vertical bearing sleeve 16 secured in place by screw-bolts 17 and in the sleeve 16 is journaled a vertical transmission shaft 19 having fast on its upper end a sprocket wheel 20, and fast on its lower end a worm wheel or spiral gear 21. This latter is driven by a worm or spiral gear 22 (Fig. 8) that is splined on a feed shaft 23 journaled in and lengthwise of the bed 12 beneath the table 15; the feed shaft being driven from the headstock end of the lathe. The worm wheel or spiral gear 21 and worm or spiral gear 22 are enclosed in a housing 24 rigid with the lower end of the bearing sleeve 16 and itself sleeved on the feed shaft 23, as clearly shown in Fig. 8.

The table 15 is designed to support on its upper flat surface one or more tool carriers and their individual slide feeds, all of the latter (where a plurality are employed) being driven from the transmission shaft 19. Figs. 4 and 5 illustrate in detail one of the tool carriers and feed mechanism, which are or may be all alike. 25 designates the slide base, the base flanges 25′ of which are formed with holes 26 and 27 to receive screw bolts 28 and dowels 29 by which the base is rigidly attached, in any predetermined position, to the top of the table. Mounted and guided on the base 25 by ways 30 and gibs 31 is the tool-carrying slide 32. The feed of the slide is effected by the feed mechanism clearly shown in Fig. 4, and comprising the following parts. Journaled in a bearing 33 at the rear end of the base is a vertical shaft 34, on the lower end of which is a sprocket wheel 35 that is driven from the sprocket wheel 20 by a sprocket chain 36 (Fig. 1). The sprocket wheel 35 is keyed or pinned to the shaft 34 in such a way as to be readily interchangeable with larger or smaller sprockets, independently of the corresponding sprockets on other slides, thereby forming great flexibility of feeds on the same piece of work. Fast on the upper end of the shaft 34 is a bevel gear 37, which drives, through a mating bevel gear 38, a long feed screw 39 that is journaled at 40 in an upstanding boss or bracket 41 on the base. On the under side of the slide 32 are a pair of depending bosses 42 and 43, the former having a smooth hole 44 and the latter an internally threaded hole 45. In the hole 44 is splined a nut 46 engaged with the screw 39, and engaged with the threaded hole 45 is an adjusting nut 47 having a smooth bore 48 through which the screw 39 passes. Between the nuts 46 and 47 is a coil compression spring 49 encircling the screw 39. In the lower end of the boss 42 is a striker pin 50, in line with which is an adjustable stop pin 51 mounted in the forward end of the base. As the slide feeds forward, at the completion of its feed movement the pin 50 strikes the stop-pin 51, arresting the movement of the slide; and the spring 49 is compressed during the "clean up" cut. In other words, this provision allows the spindle to make a few revolutions with the slide stopped to remove the mark of the tool from the work. The compression of the spring 49 can be regulated by the nut 47.

In the plan views, Figs. 2, 6 and 7, I have indicated the capacity of the broad, flat surfaced table 15 to accommodate one, two, three or even more individual tool carriers thereon, and also the practically universal groupings thereof relatively to each other and the work which may be employed. For instance, in Fig. 2. I show a single carrier so disposed as to feed in a direction parallel with the axis of the chuck. In Fig. 7 I show two tool carriers disposed at different oblique angles to the axis of the chuck; and in Fig. 6 I show three tool carriers—two of them disposed at right angles to the axis of the chuck and cutting the front and rear faces of the work, and the third parallel with the axis of the chuck and cutting the bore of the work. Where two, three, or more tool carriers are used at a time, their feeds may all be actuated from the shaft 19 and its sprocket 20 by a single sprocket chain suitably guided by idlers. In Fig. 7 I show the two feeds as driven by a sprocket chain 36ᵃ guided over idlers 52, 53, and 54; and in Fig. 6 I show the three feeds as driven by a sprocket chain 36ᵇ guided over idlers 52, 53ᵃ and 54ᵃ. The idlers turn on vertical studs mounted in tapped holes in the table 15; the proper positions for the idlers being easily determined from the particular set up of the machine for any given job.

In Fig. 1 I have shown a simple power mechanism for effecting the rapid traverse movements of the table and the tool carriers thereon toward and from the work. This mechanism includes an air cylinder 55 attached to one side of the bed 12, a piston 56 therein, a piston-rod 57, the portion of which outside of the cylinder is screw-threaded, as shown at 57′, and a bracket 58 bolted to the under side of the table 15 and terminating in a sleeve 58′ through which the screw portion 57′ of the piston-rod passes. The sleeve 58′ is locked in any adjusted position on the piston-rod by nuts 59 and 60. This connection of the table to the piston-rod allows the table to be adjusted toward or from the work irrespective of the position of the piston in the cylinder, and enables the inward and outward limits of travel of the table to be varied within the longitudinal range of the screw 57′. Compressed air for the cylinder 55 may be drawn from the pipe 61 which supplies air to the chuck jaw or fixture actuating devices through a pipe 62 leading into an ordinary manually operated air valve 63. by which latter the air is alternately delivered to and exhausted from the opposite ends of the cylinder by pipes 64 and 65.

The operation of the lathe has already to a considerable extent, been indicated in the description of its structure and organization, but may be briefly outlined as follows. For a given piece of work, the operative first determines the number of tools that can be simultaneously used on the work, and he then determines the correct positions of the several tool carriers on the table. This can be done by preliminarily clamping the slide bases on the table in approximately their correct positions, then advancing the table and tool carriers up to the work, then making such adjustments of position as may be necessary to bring the cutting tools into exactly correct relation to the work, then drilling and tapping in the table holes in register with the holes 26 and 27 of the slide bases, and finally applying the bolts 28 and dowels 29 by which the bases are rigidly fixed on the table for the particular job in hand. The base or bases may also be secured by clamps in T slots or by other customary clamping devices. The idlers are then applied in correct locations, to the table. and a sprocket chain of suitable length is then applied to the driving sprocket 20 and the sprockets of the several feed mechanisms. The set up is then complete for the particular job in hand. By admitting air to the right-hand end of cylinder 55 the table is rapidly advanced to the work. The spindle and feed shaft 23 are then started in operation, whereby the several tool slides are actuated on their feed movements until arrested by the stop devices 50 and 51. Since the feed shaft 23 is in gear with the spindle driving mechanism, the drive of the feed devices continues during a few revolutions of the spindle to clean up the cut on the work; the springs 49 permitting this, as already explained. A suitable trip mechanism in the headstock now reverses the motion of the feed returning the tool slides to their original or out position at a fast or slow rate as desired, whereupon the machine is automatically stopped, all parts being in a position to repeat the cycle of motions. The air is then reversed in the cylinder 55, the table retracted, the finished work removed, a fresh piece inserted, and the same cycle of operations repeated.

From the foregoing it will be seen that, as compared with an ordinary standard engine lathe equipped with tool carriers which are movable only lengthwise and crosswise of the bed, the lathe of the present invention possesses greatly increased flexibility. as well as marked simplicity of structure and organization; and is particularly advantageous in situations where a large number of identical pieces are to be turned, thus requiring a new set up only at occasional intervals when the job is changed.

It is manifest that the specific details of structure and organization herein shown and described may be varied and modified without departing from the principle of the invention or sacrificing any of the merits and advantages thereof. Hence, I reserve all such variations as fall within the spirit and purview of the appended claims.

I claim:

1. In a lathe. the combination with the headstock, chuck, and bed, of a table on the bed slidable toward and from the chuck and having a continuous smooth flat top surface, a slide base and detachable means for rigidly fastening the same at any predetermined point and angle to the top of the said table, a tool slide on said base, slide feed mechanism mounted in said base, a feed shaft, and driving connections from said feed shaft to said feed mechanism carried by said table, said driving connections being continuously in gear with said feed shaft.

2. In a lathe, the combination with the headstock, chuck, and bed having longitudinal ways, of a table slidable on said ways toward and from the chuck, a plurality of slide bases and means for securing the same in any predetermined relative positions on said table, tool slides on said bases, independent feed mechanisms mounted in said bases, a feed shaft, driving connections from said feed shaft to all of said feed mechanisms operating to actuate the latter simultaneously, and means for effecting rapid traverse movements of said table toward and from the chuck.

3. In a lathe. the combination with the headstock, chuck, and bed having longitudinal ways, of a table slidable on said ways toward and from the chuck, a slide base and means for securing the same in any predetermined position on said table, a tool slide on said base, feed mechanism mounted in said base, a feed shaft journaled in and lengthwise of the bed, a transmission shaft journaled in said table and having a sliding gear connection to said feed shaft, and driving connections from said transmission shaft to said feed mechanism.

4. In a lathe. the combination with the headstock, chuck, and bed having longitudinal ways, of a table slidable on said ways toward and from the chuck, a slide base and means for securing the same in any predetermined position on said table, a tool slide on said base feed mechanism mounted in said base, a feed shaft journaled in and lengthwise of the bed beneath said table, a vertical transmission shaft journaled in said table and having a sliding gear connection at its lower end to said feed shaft, driving connections from the upper end of said transmission shaft to said feed mechanism, and means for effecting rapid traverse movements of said table toward and from the chuck.

5. In a lathe, the combination with the headstock, chuck, and bed having longitudinal ways, of a wide flat table slidable on said ways toward and from the chuck, a plurality of slide bases and means for attaching them in any predetermined relative positions to the top surface of said table, tool slides on said bases, independent feed mechanisms mounted in said bases, a feed shaft journaled in and lengthwise of the bed beneath said table, a vertical transmission shaft journaled in said table and having a sliding gear connection at its lower end to said feed shaft, and means for actuating said feed mechanisms simultaneously from said transmission shaft.

6. In a lathe, the combination with the headstock, chuck, and bed having longitudinal ways, of a wide flat table slidable on said ways toward and from the chuck, a plurality of slide bases and means for attaching them in any predetermined relative positions to the top surface of said table, tool slides on said bases, independent feed mechanisms mounted in said bases and each including a driving sprocket wheel, a feed shaft journaled in and lengthwise of the bed beneath said table, a vertical transmission shaft journaled in said table and having a sliding gear connection at its lower end to said feed shaft, a sprocket wheel on the upper end of said transmission shaft, and a single sprocket chain engaged with said last-named sprocket wheel and with the several sprocket wheels of said feed mechanisms.

7. In a lathe, the combination with the headstock, chuck, and bed, of a table on the bed slidable toward and from the chuck, a slide base and means for attaching the same in any predetermined position to the top of said table, a tool slide on said base, mechanism for feeding said tool slide toward the work held in the chuck, an air cylinder, and a piston in said cylinder having its piston-rod connected to said table for effecting the rapid traverse movements of said table toward and from the chuck.

8. In a lathe, in combination, a tool slide carriage, a tool slide slidably mounted on said carriage, cooperating stop devices on said carriage and tool slide for limiting the feed travel of the latter, a feed screw journaled in said carriage, a nut splined in said tool slide and engaged with said feed screw, and a yielding elastic member transmitting the thrust of said nut to said tool slide.

9. In a lathe, in combination, a tool slide carriage, a tool slide slidably mounted on said carriage, cooperating stop devices on said carriage and tool slide for limiting the feed travel of the latter, a feed screw journaled in said carriage, a nut splined in said tool slide and engaged with said feed screw, a compression spring encircling said feed screw and bearing against one end of said nut and transmitting the thrust of the latter, and an adjustable abutment member for the other end of said spring mounted in said tool slide.

LOUIS E. GODFRIAUX.

DISCLAIMER 1,446,557.—*Louis E. Godfriaux*, Madison, Wis. LATHE. Patent dated February 27, 1923. Disclaimer filed September 13, 1929, by the assignee, *Gisholt Machine Company*.

Hereby enters its disclaimer to claim 7 of the said Letters Patent, which is in the following words:

"7. In a lathe, the combination with the headstock, chuck, and bed, of a table on the bed slidable toward and from the chuck, a slide base and means for attaching the same in any predetermined position to the top of said table, a tool slide on said base, mechanism for feeding said tool slide toward the work held in the chuck, an air cylinder, and a piston in said cylinder having its piston-rod connected to said table for effecting the rapid traverse movements of said table toward and from the chuck."

except as the element "mechanism for feeding said tool slide toward the work held in the chuck" is interpreted and construed to mean—*power mechanism operative in all positions of the table on the bed for feeding said tool slide toward the work held in the chuck*.

[*Official Gazette October 1, 1929*]